(12) United States Patent
Zhu et al.

(10) Patent No.: US 11,159,582 B2
(45) Date of Patent: Oct. 26, 2021

(54) TERMINATING CALL HANDLING FOR POWER SAVING ACTIVATED USER EQUIPMENT

(71) Applicant: Telefonaktiebolaget LM Ericsson (publ), Stockholm (SE)

(72) Inventors: Jinyin Zhu, Shanghai (CN); Afshin Abtin, Sollentuna (SE); Ralf Keller, Würselen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/650,549

(22) PCT Filed: Oct. 11, 2017

(86) PCT No.: PCT/CN2017/105733
§ 371 (c)(1),
(2) Date: Mar. 25, 2020

(87) PCT Pub. No.: WO2019/071473
PCT Pub. Date: Apr. 18, 2019

(65) Prior Publication Data
US 2020/0322393 A1    Oct. 8, 2020

(51) Int. Cl.
*H04L 29/06* (2006.01)
*H04W 8/04* (2009.01)
(Continued)

(52) U.S. Cl.
CPC ...... *H04L 65/1016* (2013.01); *H04L 65/1006* (2013.01); *H04L 65/1069* (2013.01);
(Continued)

(58) Field of Classification Search
CPC ............. H04L 65/1016; H04L 65/1006; H04L 65/1069; H04L 65/1073; H04L 65/10;
(Continued)

(56) References Cited

U.S. PATENT DOCUMENTS 10,514,746 B2    12/2019    Chuang
10,602,483 B2 *   3/2020    Singh ................... H04W 68/12
(Continued)

FOREIGN PATENT DOCUMENTS

| CN | 105979573 A | 9/2016 |
| WO | 2016161267 A1 | 10/2016 |

OTHER PUBLICATIONS

International Search Report and the Written Opinion of the International Searching Authority, issued in corresponding International Application No. PCT/CN2017/105733, dated Jun. 27, 2018, 8 pages.
(Continued)

*Primary Examiner* — Afshawn M Towfighi
(74) *Attorney, Agent, or Firm* — Rothwell, Figg, Ernst & Manbeck, P.C.

(57) ABSTRACT

The embodiments herein relate to terminating call handling for power saving activated user equipment. In one embodiment, there proposes a method in a IP Multimedia Subsystem Application Server, IMS-AS, for handling a terminating call for a User Equipment, UE, using power saving functionality, comprising: obtaining power saving information of the UE; handling the terminating call based on the power saving information. With the embodiments, the time and network resource for the terminating call can be saved and the user's experience can be enhanced.

17 Claims, 9 Drawing Sheets

(51) Int. Cl.
*H04W 52/02* (2009.01)
*H04W 88/18* (2009.01)

(52) U.S. Cl.
CPC .......... *H04L 65/1073* (2013.01); *H04W 8/04* (2013.01); *H04W 52/0258* (2013.01); *H04W 88/18* (2013.01)

(58) Field of Classification Search
CPC .......................... H04L 65/1003; H04W 8/04; H04W 52/0258; H04W 88/18; H04W 52/0209; H04W 40/005; H04W 68/02; H04W 52/0235; H04W 52/0238; H04W 52/0203; Y02D 30/70
See application file for complete search history.

(56) References Cited

U.S. PATENT DOCUMENTS

| | | | | |
|---|---|---|---|---|
| 2007/0297373 | A1* | 12/2007 | Saifullah | H04W 48/18 370/338 |
| 2009/0093249 | A1* | 4/2009 | Zhu | H04L 65/1073 455/433 |
| 2017/0127460 | A1* | 5/2017 | Chandramouli | H04L 69/24 |

OTHER PUBLICATIONS

LG Electronics "Solution for Key issue 3 Mobility Framework "Solution for UE Power Saving Function"", SA WG2 Meeting S2#114, S2-161551, Apr. 11-15, 2016, Sophia Antipolis, France, 3 pages.
3GPP 3rd Generation Partnership Project; Technical Specification Group Services and System Aspects; General Packet Radio Service (GPRS) enhancements for Evolved Universal Terrestrial Radio Access Network (E-UTRAN) access (Release 14), 3GPP TS 23.401 V14.3.0 (Mar. 2017), 386 pages.
3GPP 3rd Generation Partnership Project; Technical Specification Group Services and System Aspects; Architecture enhancements to facilitate communications with packet data networks and applications (Release 15), 3GPP TS 23.682 V15.0.0 (Mar. 2017), 109 pages.
3GPP 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14), 3GPP TS 29.272 V14.3.0 (Mar. 2017), 162 pages.
3GPP 3rd Generation Partnership Project; Technical Specification Group Core Network and Terminals; IP Multimedia (IM) Subsystem Cx and Dx interfaces; Signalling flows and message contents (Release 14), 3GPP TS 29.228 V14.2.0 (Mar. 2017), 81 pages.
3GPP 3rd Generation Partnership Project; Technical Specification Group Core Network and Terminals; Cx and Dx interfaces based on the Diameter protocol; Protocol details (Release 14), 3GPP TS 29.229 V14.1.0 (Mar. 2017), 41 pages.
3GPP 3rd Generation Partnership Project; Technical Specification Group Services and System Aspects; IP Multimedia Subsystem (IMS); Stage 2 (Release 14), 3GPP TS 23.228 V14.3.0 (Mar. 2017), 321 pages.
3GPP 3rd Generation Partnership Project; Technical Specification Group Core Network and Terminals; IP Multimedia (IM) Subsystem Sh interface; Signalling flows and message contents (Release 15), 3GPP TS 29.328 V15.0.0 (Jun. 2017), 77 pages.
3GPP 3rd Generation Partnership Project; Technical Specification Group Core Network and Terminals; Sh Interface based on the Diameter protocol; Protocol details (Release 15), 3GPP TS 29.329 V15.0.0 (Jun. 2017), 25 pages.
Spirent "Long Term Evolution (LTE and Voice over LTE (VoLTE)" Youtube, (May 23, 2012), p. 1 pp., URL: https://www.youtube.com/watch?v=EOmCjhr9mk4.
Samsung "Legacy functionality impac result from RAN initiated paging" 3GPP TSG-RAN WG3 #93, R3-161652, Gothenburg, Sweden; Aug. 22-26, 2016, 5 pages.
NEC "Editor's note removal and correction to the Network Assisted Power Saving solution" SA WG2 Meeting #98, S2-132851, Jul. 15-19, 2013, Valencia, Spain, 5 pages.
3GPP 3rd Generation Partnership Project; Technical Specification Group Services and System Aspects; Architecture enhancements to facilitate communications with packet data networks and applications (Release 15), 3GPP TS 23.682 V15.2.0 (Sep. 2017), 122 pages.
3GPP "Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 version 9.2.0 Release 9)" ETSI TS 129 272 V9.2.0 (Apr. 2010), 86 pages.

* cited by examiner

TERMINATING CALL HANDLING FOR POWER SAVING ACTIVATED USER EQUIPMENT

CROSS REFERENCE TO RELATED APPLICATION(S)

This application is a 35 U.S.C. § 371 National Phase Entry Application from PCT/CN2017/105733, filed Oct. 11, 2017, designating the United States, the disclosure of which is incorporated herein by reference in its entirety.

TECHNICAL FIELD

The embodiments herein relate generally to wireless communication, and more particularly, the embodiments herein relate to method and apparatus for handling or facilitating to handle terminating call for a User Equipment, UE, using power saving functionality.

BACKGROUND

According to current third Generation Partnership Project, 3GPP Technical Specification TS23.682, Power Saving functionality, i.e. Power saving mode, PSM, and enhanced Discontinuous Reception, eDRX, is intended for UEs that are expecting only infrequent mobile originating and terminating services and that can accept a corresponding latency in the mobile terminating communication.

According to current 3GPP standard, both Power Saving functionality, i.e. PSM and eDRX, and Voice over LTE, VoLTE, can be supported by a CAT-M1 UE. Power Saving functionality is requested by UE and enabled by MME. VoLTE functionality is requested by UE and enabled by EPC and IMS. Then for a UE, e.g. category-M1 (CAT-M1) UE, which is VoLTE capable (see GSMA PRD NG.108) and supports Power Saving functionality, there are two options:

1. Does not request to activate Power Saving functionality because VoLTE terminating call (and other terminating services) is prioritized;
2. Request to activate Power Saving functionality because power saving is prioritized but without intension to receive terminating call (or other terminating services) instantly.

A UE aiming to receive terminating call should not request for Power Saving functionality and correspondingly a UE request for Power Saving functionality should not expect to receive the terminating call instantly.

If option 2 is adopted by UE and Power Saving request is accepted by mobility management entity, MME, i.e. Power Saving is activated, when there is a terminating call to the UE, the call will likely fail if the UE is not reachable, e.g. UE in sleeping status or UE is not in paging occasion period for eDRX.

Since whether Power Saving is activated is the result of negotiation between UE and MME, HSS and IMS domain have no knowledge of it. So, for a UE which has successfully activated Power Saving functionality and successfully registered in IMS domain for the VoLTE service (for originating call mainly), when there is a terminating call, the call will be handled as normal in IMS domain and the SIP signaling will be delivered to EPC as payload.

Hence, for a UE which has successfully activated Power Saving functionality and successfully registered in IMS domain for the VoLTE service (for originating call mainly), the terminating call can still be triggered. The terminating call will be handled as normal with the difference that the network will not be able to reach the UE to deliver the terminating call request if the UE is determined to be unreachable, i.e. in sleeping status or not in paging occasion period, and in this case the terminating call request will be buffered.

Although the call failure is as expected, but there will be waste of both time and network resource before the call is determined to be failed. This will also impact the originating user's experience.

In details, if the terminating call is finally failed due to not being able to reach UE in time, there is a waste of both time and network resources. Another problem is that IMS domain does not know the root cause of this call failure and as a result the call setup success rate KPI of terminating call is impacted.

Waste of time means the IMS domain and originating UE has to wait till time-out for the terminating call before the call is determined as failed. Some examples of waste of network resources are listed as below:

1. SIP signaling in IMS domain which involves nodes as S-CSCF, MMTel-AS/SCC-AS, P-CSCF;
2. Signaling towards HSS and MME/SGSN (e.g. for T-ADS);
3. Payload (SIP signaling) delivering, i.e. from P-CSCF to PGW and then to SGW;
4. Signaling between SGW and MME (e.g. DDN);
5. Payload buffering in SGW;
6. Signaling in EPC and RAN when UE becomes reachable for the delivery of buffered payload.

SUMMARY

In view of the above deficiency, embodiments in this disclosure aim to improve the network resource efficiency and user experience for terminating call towards Power Saving activated UE. In embodiments herein, when terminating call is triggered towards a UE which has Power Saving activated, the IMS must be informed with Power Saving Information, i.e. whether Power Saving is activated and the current Power Saving Status. Then IMS further handles the terminating call based on Power Saving Information.

According to an aspect, the object is achieved by a method in a mobility management node, for facilitating to handle terminating call for a User Equipment, UE, using power saving functionality, comprising: informing a subscriber serving node, about information indicating whether UE power saving is activated or deactivated; in response of a current power saving status query from the subscriber serving node, providing the current power saving status of the UE to the subscriber serving node, in order to facilitate to handle the terminating call according to the current power saving status.

According to another aspect, the object is achieved by a method in a subscriber serving node, for facilitating to handle terminating call for a User Equipment, UE, using power saving functionality, comprising: receiving, from a mobility management node, information indicating whether UE power saving is activated or deactivated; receiving the request from a IP Multimedia Subsystem Application Server, IMS-AS, subscribing the notification of UE power saving activation and deactivation and sending the notification to IMS-AS when power saving is activated or deactivated; during the terminating call, or in response of a UE power saving status request from the IMS-AS, initiating a current power saving status query to the mobility management node in order to obtain a current power saving status of the UE; during the terminating call, forwarding the current power saving status to IMS domain.

According to yet another aspect, the object is achieved by a method in a IP Multimedia Subsystem Application Server, IMS-AS, for handling a terminating call for a User Equipment, UE, using power saving functionality, comprising: obtaining power saving information of the UE; handling the terminating call based on the power saving information.

According to yet another aspect, the object is achieved by a method in a User Equipment, UE using power saving functionality, for facilitating to handle terminating call for the UE, comprising: determining the power saving functionality to be activated or deactivated, sending information indicating whether UE power saving is activated or deactivated to IP Multimedia Subsystem, IMS, domain, in order to handle the terminating call accordingly in the IMS domain.

According to yet another aspect, the object is achieved by a method in a Call Session Control Function, CSCF, for facilitating to handle a terminating call for a User Equipment, UE, using power saving functionality, comprising: receiving power saving information of the UE; transparently forwarding the power saving information to a IP Multimedia Subsystem Application Server, IMS-AS, in order to handle the terminating call in the IMS domain according to the power saving information.

According to yet another aspect, the object is achieved by an apparatus configured to operate as a mobility management node, for facilitating to handle terminating call for a User Equipment, UE, using power saving functionality, comprising: at least one processor; and a non-transitory computer readable medium coupled to the at least one processor, the non-transitory computer readable medium containing instructions executable by the at least one processor, whereby the at least one processor is configured to: inform the subscriber serving node, about information indicating whether UE power saving is activated or deactivated; in response of a current power saving status query from the subscriber serving node, provide the current power saving status of the UE to the subscriber serving node, in order to facilitate to handle the terminating call according to the current power saving status.

According to yet another aspect, the object is achieved by an apparatus configured to operate as a subscriber serving node, for facilitating to handle terminating call for a User Equipment, UE, using power saving functionality, comprising: at least one processor; and a non-transitory computer readable medium coupled to the at least one processor, the non-transitory computer readable medium containing instructions executable by the at least one processor, whereby the at least one processor is configured to: receive, from a mobility management node, information indicating whether UE power saving is activated or deactivated; receive the request from a IP Multimedia Subsystem Application Server, IMS-AS, subscribing the notification of UE power saving activation and deactivation and send the notification to IMS-AS when power saving is activated or deactivated; during the terminating call, or in response of a UE power saving status request from the IMS-AS, initiate a current power saving status query to the mobility management node in order to obtain a current power saving status of the UE; during the terminating call, forward the current power saving status to IMS domain.

According to yet another aspect, the object is achieved by an apparatus configured to operate as a IP Multimedia Subsystem Application Server, IMS-AS, for handling a terminating call for a User Equipment, UE, using power saving functionality, comprising: at least one processor; and a non-transitory computer readable medium coupled to the at least one processor, the non-transitory computer readable medium containing instructions executable by the at least one processor, whereby the at least one processor is configured to: obtain power saving information of the UE; handle the terminating call based on the power saving information.

According to yet another aspect, the object is achieved by an apparatus configured to operate as a User Equipment, UE using power saving functionality, for facilitating to handle terminating call for the UE, comprising: at least one processor; and a non-transitory computer readable medium coupled to the at least one processor, the non-transitory computer readable medium containing instructions executable by the at least one processor, whereby the at least one processor is configured to: determine the power saving functionality to be activated or deactivated, send information indicating whether UE power saving is activated or deactivated to IP Multimedia Subsystem, IMS, domain, in order to handle the terminating call accordingly in the IMS domain.

According to yet another aspect, the object is achieved by an apparatus configured to operate as a Call Session Control Function, CSCF, for facilitating to handle a terminating call for a User Equipment, UE, using power saving functionality, comprising: at least one processor; and a non-transitory computer readable medium coupled to the at least one processor, the non-transitory computer readable medium containing instructions executable by the at least one processor, whereby the at least one processor is configured to: receive power saving information of the UE; transparently forward the power saving information to a IP Multimedia Subsystem Application Server, IMS-AS, in order to handle the terminating call in the IMS domain according to the power saving information.

According to yet another aspect, the object is achieved by a computer readable medium comprising computer readable code, which when run on an apparatus, causes the apparatus to perform the above method.

The embodiments herein will improve the network resource efficiency and will also improve originating user's experience in case Power Saving is activated for the terminating VoLTE UE. It can also improve the terminating call KPI (Key performance Indicator) because it is known that some call failure is caused by Power Saving functionality.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Figure 1:
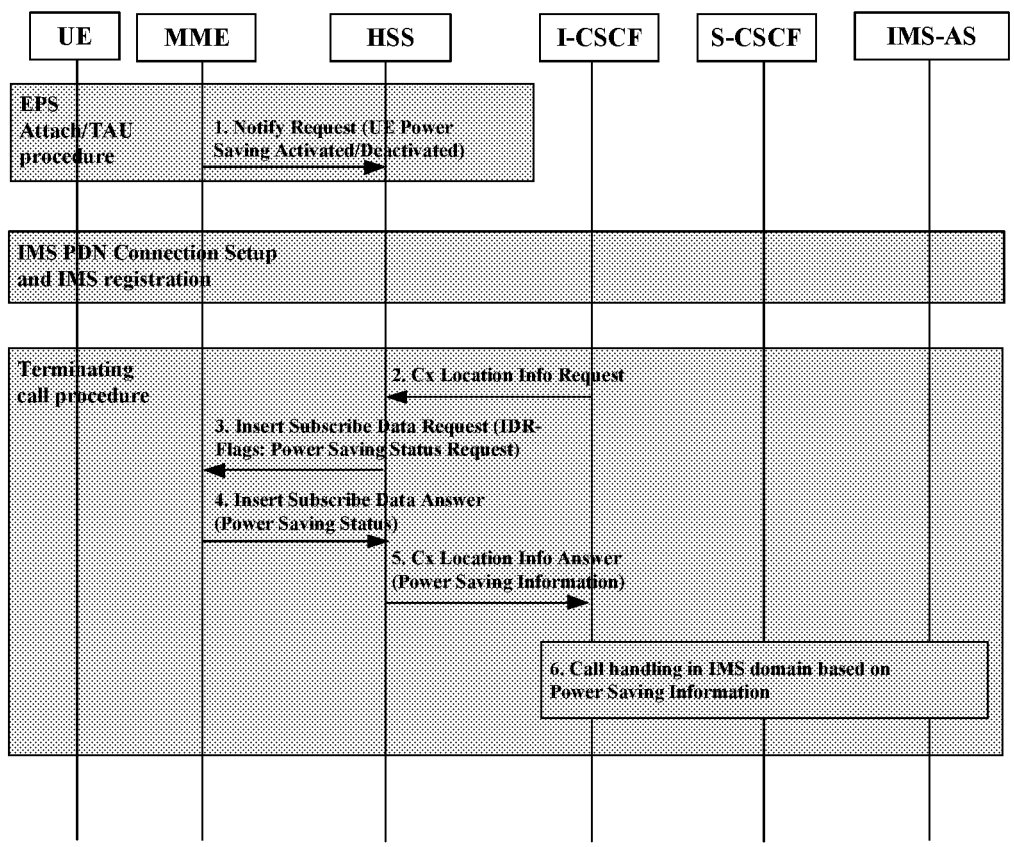
FIG. 1 shows an example for handling terminating call for UE using power saving functionality, according to embodiments.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Embodiments herein propose solutions, in which, when Power Saving is activated or deactivated for a UE during Attach or TAU procedure, MME informs HSS about this. During terminating call, HSS, either based on local policy or triggered by IMS-AS, queries MME for the current Power Saving Status and provides it to IMS. Power Saving Status indicates whether the UE is currently reachable and optionally a time when the UE can be reachable.

Note that, examples of the time in Power Saving Status: for eDRX, it indicates the time of next paging occasion; for PSM, it indicates the time of UE's next waking up. For PSM, only when the time to UE's next waking up is short enough, e.g. a few seconds, and shorter than the Active Time value can MME include this information in Power Saving Status.

There are different solutions to trigger the Power Saving Status query, for example:

Solution #1: HSS triggered. In this solution HSS takes the control and triggers Power Saving Status query during terminating call. Then HSS sends the Power Saving Information to IMS.

Solution #2: IMS-AS triggered. In this solution IMS-AS takes the control and triggers Power Saving Status query during terminating call. One precondition is that IMS-AS must be informed once Power Saving is activated or deactivated.

Based on the Power Saving Information, i.e. whether Power Saving is activated and the current Power Saving Status, IMS further handles the terminating call, e.g., as below:

a. continue with the call if UE is reachable (per normal MT procedures)

b. reject the call directly if the UE is not reachable c. continue with the call even if the UE is not reachable but will become reachable within a short period d. reject the call with an indication to originating side that the call can be made some time, e.g. a few seconds, later.

e. trigger applicable Supplementary services e.g. forwarding to voice mail or announcement.

In this disclosure, while the problem and the solution for Evolved Universal Terrestrial Radio Access Network, E-UTRAN, and Evolved Packet Core, EPC, but the problem and solution is equally applicable to 5G-RAN and 5GC. For 5G, MME can be replaced by Access and Mobility Management Function, AMF (or Session Management Function, SMF); HSS is Unified Data Management, UDM. In yet another embodiment, the MME, AMF (or SMF) can be referred as a general term, such as a mobility management node; and the HSS and UDM can be referred as a general term, such as a subscriber serving node.

FIG. 1 shows an example for handling terminating call for UE using power saving functionality, according to embodiments; which shows terminating call handling based on HSS triggered Power Saving Status query. In this solution, when HSS is informed that Power Saving has been activated for UE, HSS keeps the information without further spreading it to IMS nodes.

When terminating call is triggered, for a Power Saving activated UE, HSS decides based on local policy to query MME for current Power Saving Status and then provides Power Saving information to IMS nodes. IMS nodes further handle the call based on the Power Saving information.

In the method of terminating call handling based on HSS triggered Power Saving Status query in FIG. 1, there are the following steps:

1. During EPS Attach, and if UE has requested power saving to the MME and the MME has accepted power saving, then MME indicates UE Power Saving Activated to HSS using Notify Request message. During Tracking Area Update, TAU, procedure, if Power Saving activation/deactivation is changed, MME also indicates to HSS about this using Notify Request message. HSS stores this information.

2. When a terminating call is triggered towards the UE, I-CSCF sends a Cx Location Info Request to HSS.

3. If UE Power Saving is activated for this subscriber, HSS optionally, based on local policy, sends Insert Subscriber Data Request to MME querying current Power Saving Status.

4. MME sends Insert Subscriber Data Answer to HSS reporting current Power Saving Status.

5. HSS sends a Cx Location Info Answer to I-CSCF and in the message Power Saving Information is included.

6. I-CSCF continues as normal, continues with an indication in SIP signaling for further actions in MMTel AS or rejects the terminating call based on the Power Saving Information.

Note that only impacted messages are highlighted and described in the FIG. 1. Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

With the embodiments shown in FIG. 1, the time and network resource for the terminating call can be saved and the user's experience can be enhanced.

Figure 2:
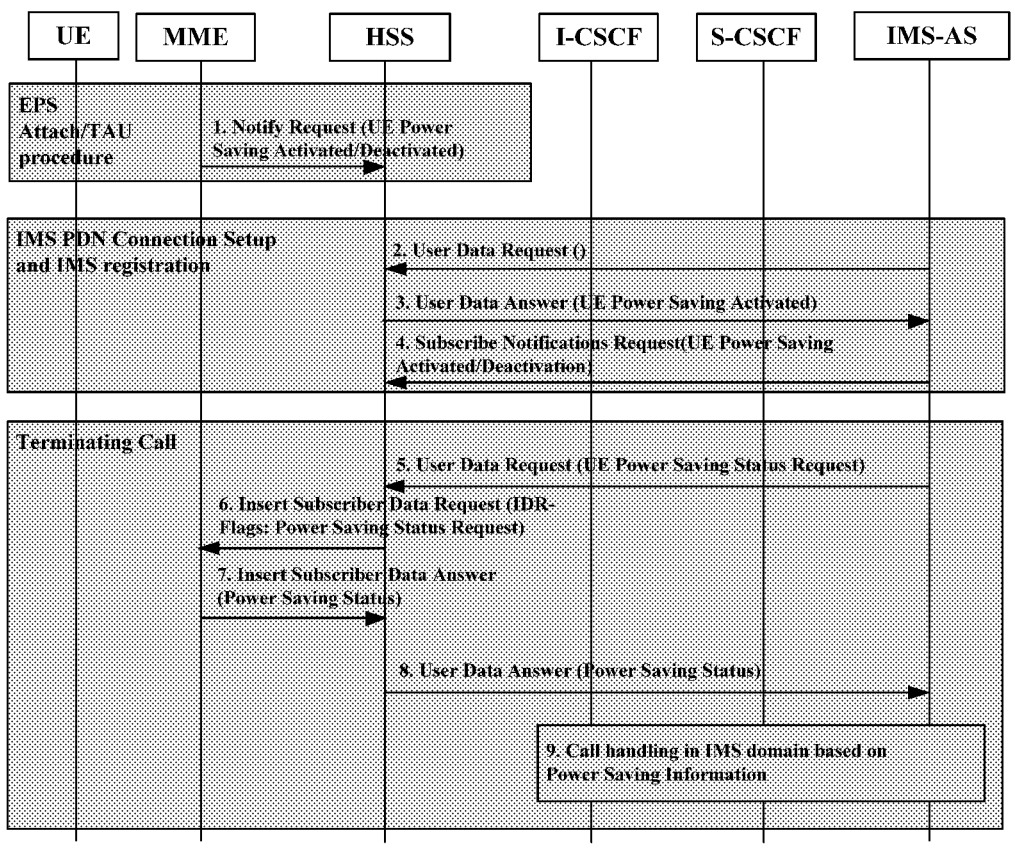
FIG. 2 shows another example for handling terminating call for UE using power saving functionality, according to embodiments.

FIG. 2 shows another example for handling terminating call for UE using power saving functionality, according to embodiments, which shows Terminating call handling based on IMS-AS triggered Power Saving Status query. In this solution, when HSS is informed that Power Saving has been activated for UE, HSS sends the information to IMS-AS.

When terminating call is triggered, for a Power Saving activated UE, IMS-AS decides based on local policy to query HSS for current Power Saving Status and then HSS queries MME for this. After the Power Saving Status query procedure, IMS nodes further handle the call based on the Power Saving information.

In the method of terminating call handling based on IMS-AS triggered Power Saving Status query in FIG. 2, there are the following steps:

1. During EPS Attach, and if UE has requested power saving to the MME and the MME has accepted power saving, then MME indicates UE Power Saving Activated to HSS using Notify Request message. During TAU procedure, if Power Saving activation/deactivation is changed, MME also indicates to HSS about this using Notify Request message. HSS stores this information.

2. During IMS registration procedure IMS Core as part of 3GPP defined 3:rd Party Register mechanism notifies the IMS about the registration and IMS AS downloads the subscriber profile from HSS 3. HSS indicates UE Power Saving Activated to IMS-AS in response to the user profile request.

4. IMS-AS subscribes the change of Power Saving activation/deactivation towards HSS.

5. When a terminating call is triggered towards the UE, IMS-AS optionally, based on local policy, queries current Power Saving Status from HSS if Power Saving is activated for the UE.

6. HSS sends Insert Subscriber Data Request to MME querying current Power Saving Status.

7. MME sends Insert Subscriber Data Answer to HSS reporting current Power Saving Status.

8. HSS sends Power Saving Status to IMS-AS.

9. IMS-AS further handles the terminating call based on Power Saving Status.

Note that only impacted messages are highlighted and described in the FIG. 1.

There can be several variant for the above solution shows in FIG. 1 and FIG. 2. Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

With the embodiments shown in FIG. 1, the time and network resource for the terminating call can be saved and the user's experience can be enhanced.

In one embodiment, the present disclosure further proposes a solution, with this solution, if Power Saving Status query is controlled by SCC-AS, the query procedure can be combined with T-ADS procedure where applicable.

Figure 3:
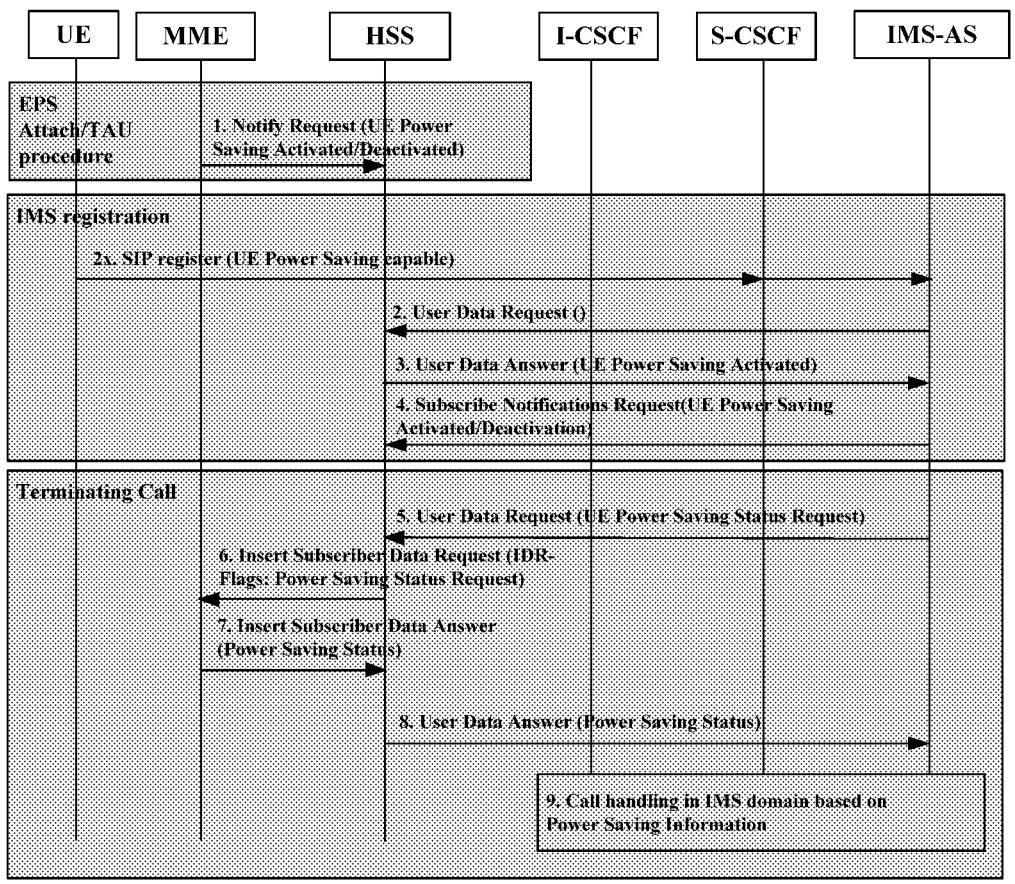
FIG. 3 shows yet another example for handling terminating call for UE using power saving functionality, according to embodiments.

In one embodiment, the present disclosure further proposes a solution. This solution is shown in FIG. 3, which shows yet another example for handling terminating call for UE using power saving functionality, according to embodiments. This solution is a variant of the embodiments shown in FIG. 2. With this solution, the UE may also include a Power Saving capability indicator in SIP Register toward IMS. This indicator can be provided to IMS AS as part of existing 3GPP specified mechanism in third Party Register from IMS Core to IMS AS. In one embodiment, in step 4, subscribe to "UE Power Saving Status" from IMS AS to HSS can then optionally be performed for such devices only. This could be considered as an optimization to avoid subscribe to status change if UE is not Power Saving capable. The "Power Saving Status" provided from HSS to IMS AS in step 3 may indicate that Power Saving is not used but the UE may at later stage enable this function e.g. as part of next TAU procedure so without such UE provided indicator, IMS AS would need to subscribe to HSS for all devices.

Figure 4:
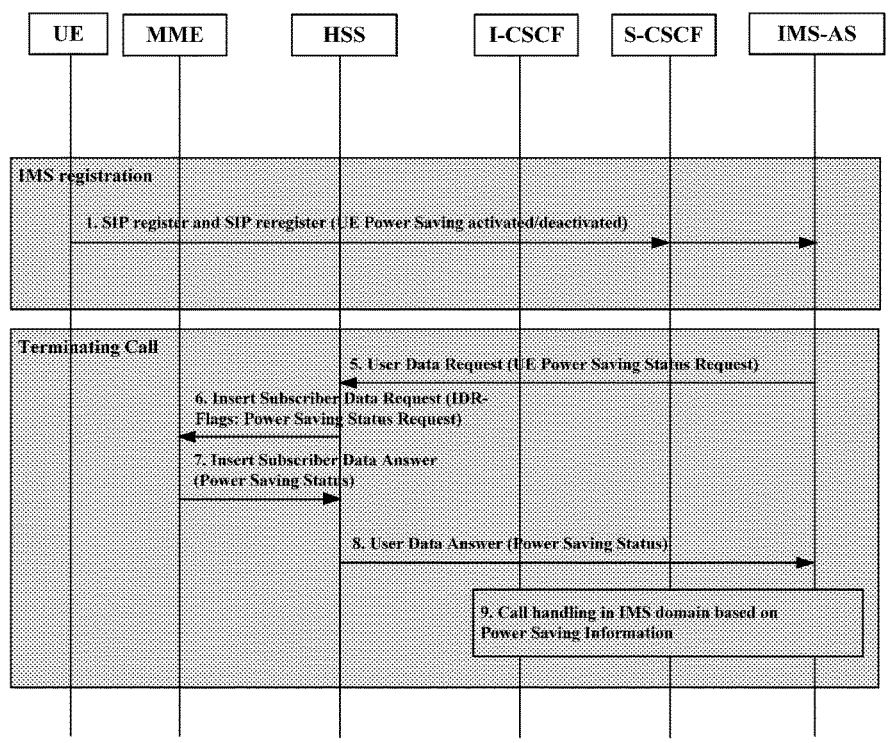
FIG. 4 shows yet another example for handling terminating call for UE using power saving functionality, according to embodiments.

In one embodiment, the present disclosure further proposes a solution. This solution is shown in FIG. 4, which shows yet another example for handling terminating call for UE using power saving functionality, according to embodiments. This solution relies on UE to provide its status of Power Saving activated/deactivated via SIP REGISTER mechanism. As shown in FIG. 4, while step 2 and step 3 in FIG. 2 would still be performed but without any Power Saving state information and step 4 in FIG. 2 is not performed. The UE on transition of Power Saving activation/deactivation, could indicate it over SIP interface by sending a SIP Re-Register and include this information. Step 5 could include request for Power Saving Status Report only if previous (re-)registration indicated that Power Saving is activated for UE.

Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

With the embodiments shown in FIG. 3 and FIG. 4, the time and network resource for the terminating call can be saved and the user's experience can be enhanced.

In one embodiment herein, the 3GPP Technical Specification may need to be changed. In one embodiment, for S6a interface (between HSS and MME), new feature "UE Power Saving Status Report" should be added to Supported-Features Attribute-Value Pair, AVP; new AVP "UE Power Saving Enabled" should be added in Notify Request message; new bit indicating "Power Saving Status Report" should be added to IDR-Flags AVP; new AVP "Power Saving Status" AVP should be added in Insert Subscriber Data Answer message. In one embodiment, for Cx interface (between HSS and I-CSCF), new AVP "Power Saving Status" AVP should be added in Cx Location Info Answer and/or Sh interface (IMS Application Server to HSS).

Figure 5:
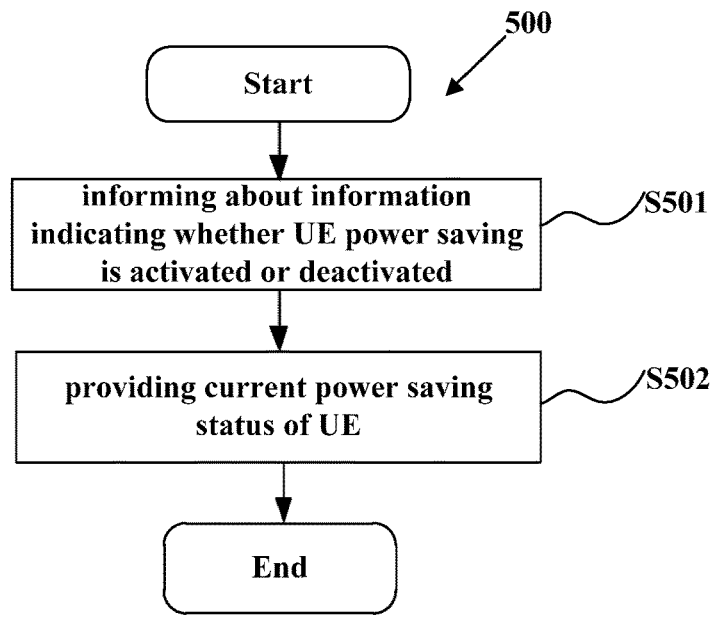
FIG. 5 is a schematic flow chart showing a method in MME for facilitating to handle terminating call for UE using power saving functionality, according to embodiments.

FIG. 5 is a schematic flow chart showing a method 500 in MME for facilitating to handle terminating call for UE using power saving functionality, according to embodiments.

The method 500 may begin with step S501, informing a Home Subscriber Server, HSS, about information indicating whether UE power saving is activated or deactivated.

In one embodiment, the method 500 may proceed to step S502, in response of a current power saving status query from the HSS, providing the current power saving status of the UE to the HSS, in order to facilitate to handle the terminating call according to the current power saving status.

In one embodiment, the current power saving status may indicate whether the UE is currently reachable and optionally indicate a time when the UE can be reachable.

Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

With the embodiments shown in FIG. 5, the time and network resource for the terminating call can be saved and the user's experience can be enhanced.

Figure 6:
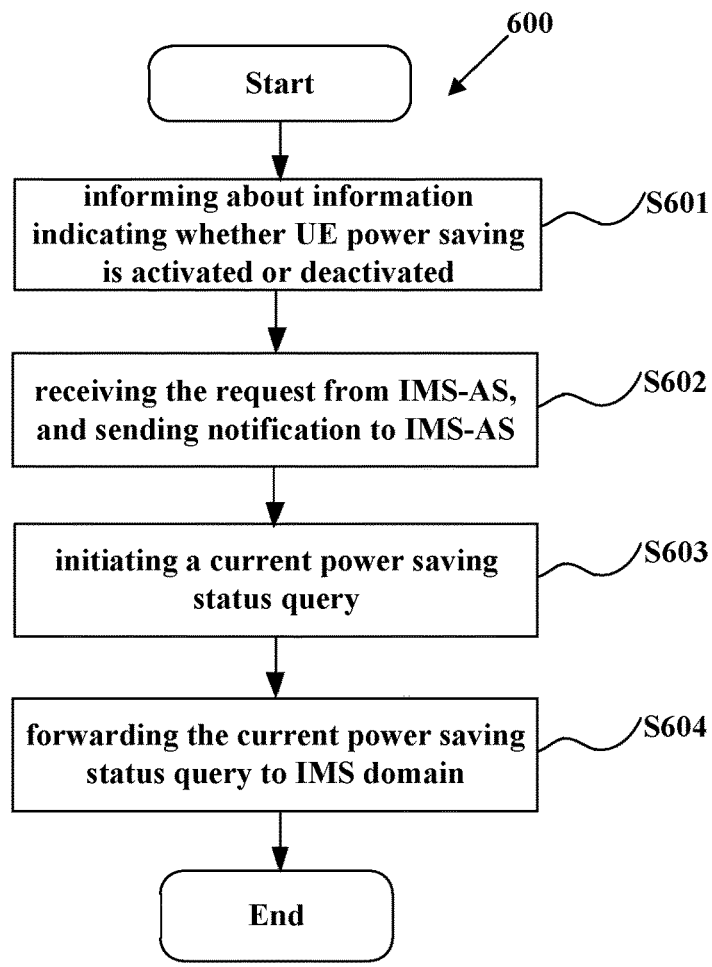
FIG. 6 is a schematic flow chart showing a method in HSS for facilitating to handle terminating call for UE using power saving functionality, according to embodiments.

FIG. 6 is a schematic flow chart showing a method 600 in HSS for facilitating to handle terminating call for UE using power saving functionality, according to embodiments.

The method 600 may begin with step S601, receiving, from a Mobility Management Entity, MME, information indicating whether UE power saving is activated or deactivated.

In one embodiment, the method 600 may proceed to step S602, receiving the request from a IP Multimedia Subsystem Application Server, IMS-AS, subscribing the notification of UE power saving activation and deactivation and sending the notification to IMS-AS when power saving is activated or deactivated.

In one embodiment, the method 600 may proceed to step S603, during the terminating call, or in response of a UE power saving status request from the IMS-AS, initiating a current power saving status query to the mobility management node in order to obtain a current power saving status of the UE.

In one embodiment, the method 600 may proceed to step S604, during the terminating call, forwarding the current power saving status to IMS domain.

In one embodiment, the method 600 may further comprise: sending the information indicating whether UE power saving is activated or deactivated to the IMS-AS in a User Data Answer message in an IMS registration process, upon received from the MME.

In one embodiment, the current power saving status may indicate whether the UE is currently reachable and optionally indicate a time when the UE can be reachable.

Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

With the embodiments shown in FIG. 6, the time and network resource for the terminating call can be saved and the user's experience can be enhanced.

Figure 7:
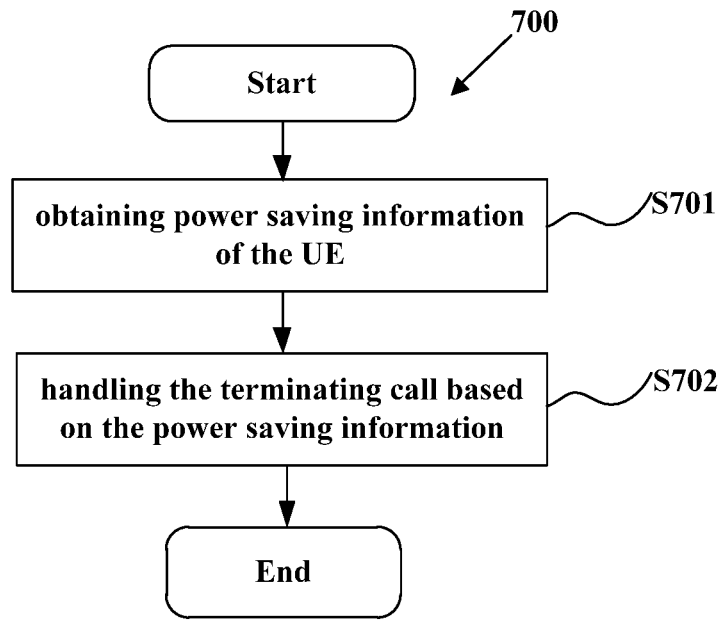
FIG. 7 is a schematic flow chart showing a method in IMS-AS for handling terminating call for UE using power saving functionality, according to embodiments.

FIG. 7 is a schematic flow chart showing a method 700 in IMS-AS for handling terminating call for UE using power saving functionality, according to embodiments.

The method 700 may begin with step S701, obtaining power saving information of the UE.

In one embodiment, the method 700 may proceed to step S702, handling the terminating call based on the power saving information.

In one embodiment, the power saving information includes information indicating whether UE power saving is activated or deactivated and current power saving status. In one embodiment, the current power saving status may indicate whether the UE is currently reachable and optionally indicate a time when the UE can be reachable.

In one embodiment, information indicating whether UE power saving is activated or deactivated is obtained from a Home Subscriber Server, HSS, in a User Data Answer message in an IMS registration process.

In one embodiment, obtaining information indicating whether UE power saving is activated or deactivated further comprising: sending a Subscribe Notifications Request to a HSS to subscribe the change of information indicating whether UE power saving is activated or deactivated; receiving a Notification including information indicating whether UE power saving is activated or deactivated.

In one embodiment, information indicating whether UE power saving is activated or deactivated is obtained from the UE in a SIP registration message in an IMS registration process.

In one embodiment, obtaining the current power saving status further comprising: sending a User Data Request message to a Home Subscriber Server, HSS, in response to the terminating call, in order to initiating a UE power saving status request; receiving a User Data Answer message including the current power saving status from the HSS, wherein the HSS obtains the current power saving status from a Mobility Management Entity, MME via a further query.

In one embodiment, handling the terminating call further comprising one of the following:
  a. continuing with the call if UE is reachable;
  b. rejecting the call directly if the UE is not reachable;
  c. continuing with the call even if the UE is not reachable but will become reachable within a short period;
  d. rejecting the call with an indication to originating side that the call can be made some time later;
  e. triggering applicable supplementary services, for example, forwarding to voice mail or announcement.

Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

With the embodiments shown in FIG. 7, the time and network resource for the terminating call can be saved and the user's experience can be enhanced.

Figure 8:
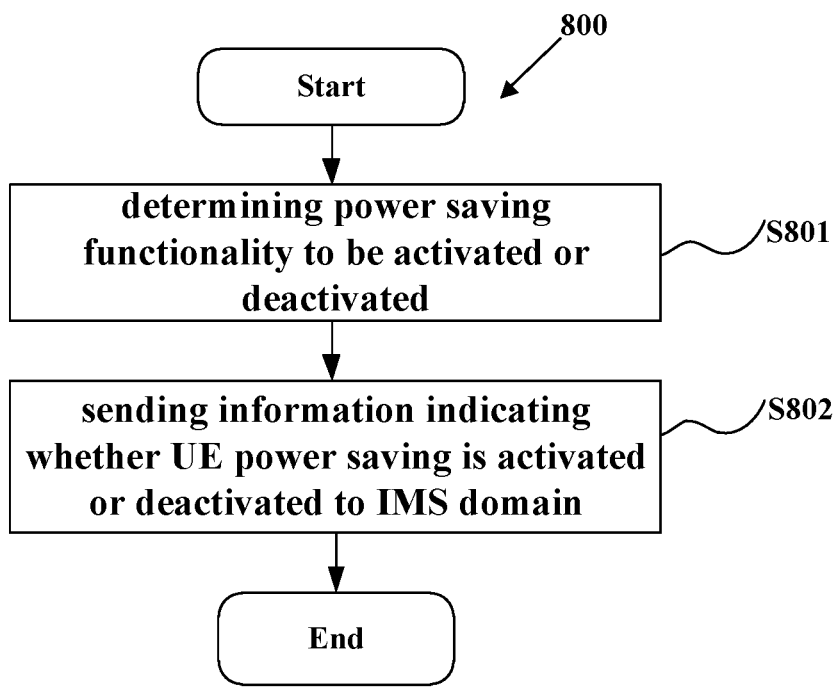
FIG. 8 is a schematic flow chart showing a method in UE using power saving functionality for facilitating to handle terminating call, according to embodiments.

FIG. 8 is a schematic flow chart showing a method 800 in UE using power saving functionality for facilitating to handle terminating call, according to embodiments.

The method 800 may begin with step S801, determining the power saving functionality to be activated or deactivated.

In one embodiment, the method 800 may proceed to step S802, sending information indicating whether UE power saving is activated or deactivated to IP Multimedia Subsystem, IMS, domain, in order to handle the terminating call accordingly in the IMS domain.

In one embodiment, the UE sends the information indicating whether UE power saving is activated or deactivated using IMS registration or reregistration procedure.

With the embodiments shown in FIG. 8, the time and network resource for the terminating call can be saved and the user's experience can be enhanced.

Figure 9:
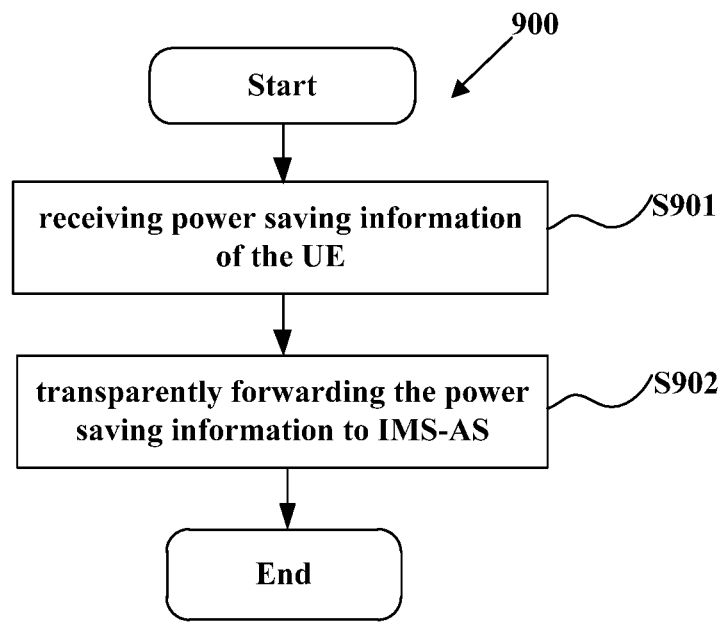
FIG. 9 is a schematic flow chart showing a method in CSCF for facilitating to handle terminating call for UE using power saving functionality, according to embodiments.

FIG. 9 is a schematic flow chart showing a method 900 in CSCF for facilitating to handle terminating call for UE using power saving functionality, according to embodiments.

The method 900 may begin with step S901, receiving power saving information of the UE.

In one embodiment, the method 900 may proceed to step S902, transparently forwarding the power saving information to a IP Multimedia Subsystem Application Server, IMS-AS, in order to handle the terminating call in the IMS domain according to the power saving information.

In one embodiment, the power saving information includes information indicating whether UE power saving is activated or deactivated and current power saving status. In one embodiment, the current power saving status may indicate whether the UE is currently reachable and optionally indicate a time when the UE can be reachable.

In one embodiment, the CSCF is an Interrogating Call Session Control Function, I-CSCF, or a Serving Call Session Control Function, S-CSCF.

With the embodiments shown in FIG. 9, the time and network resource for the terminating call can be saved and the user's experience can be enhanced.

Figure 10:
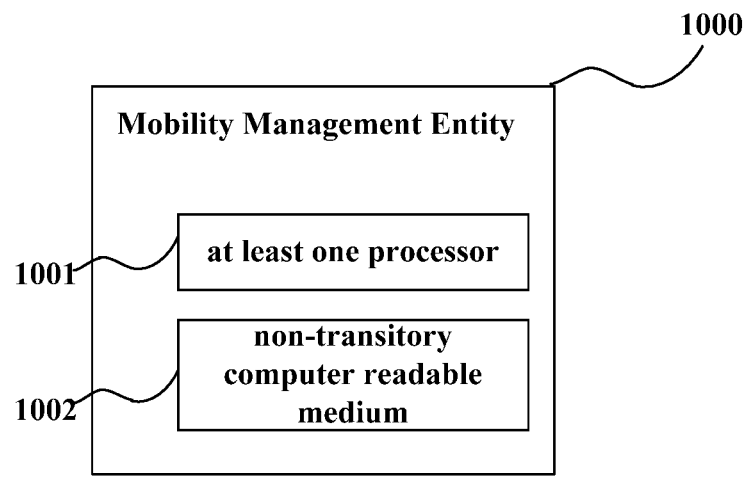
FIG. 10 is a schematic block diagram showing an apparatus configured to operate as MME for facilitating to handle terminating call for UE using power saving functionality, according to embodiments.

FIG. 10 is a schematic block diagram showing an apparatus 1000 configured to operate as MME for facilitating to handle terminating call for UE using power saving functionality, according to embodiments.

In one embodiment, the apparatus 1000 may comprise: at least one processor 1001; and a non-transitory computer readable medium 1002 coupled to the at least one processor 1001. The non-transitory computer readable medium 1002 may contain instructions executable by the at least one processor 1001, whereby the at least one processor 1001 is configured to: inform the Home Subscriber Server, HSS, about information indicating whether UE power saving is activated or deactivated; in response of a current power saving status query from the HSS, provide the current power saving status of the UE to the HSS, in order to facilitate to handle the terminating call according to the current power saving status.

In one embodiment, the current power saving status may indicate whether the UE is currently reachable and optionally indicate a time when the UE can be reachable.

Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

Note that, the embodiments shown in FIG. 10 may be embodied in hardware and/or in software (including firmware, resident software, micro-code, etc.) that runs on a processor such as a digital signal processor, which may collectively be referred to as "circuitry," "a module" or variants thereof. That is, in one embodiment, the operation of informing the HSS about information indicating whether UE power saving is activated or deactivated can be embodied in a circuitry (for example a informing circuitry) or a module (for example a informing module); and the operation of providing the current power saving status of the UE to the HSS can be embodied in a circuitry (for example a providing circuitry) or a module (for example a providing module). Accordingly, the other operation of the at least one processor 1001 can be embodied in respective circuitry, module or variants thereof.

With the embodiments shown in FIG. 10 and the above variant, the time and network resource for the terminating call can be saved and the user's experience can be enhanced.

Figure 11:
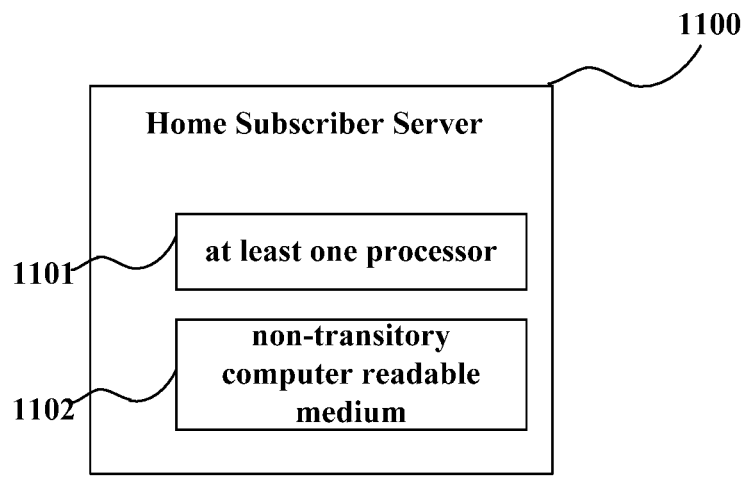
FIG. 11 is a schematic block diagram showing an apparatus configured to operate as HSS for facilitating to handle terminating call for UE using power saving functionality, according to embodiments.

FIG. 11 is a schematic block diagram showing an apparatus 1100 configured to operate as HSS for facilitating to handle terminating call for UE using power saving functionality, according to embodiments.

In one embodiment, the apparatus 1100 may comprise: at least one processor 1101; and a non-transitory computer readable medium 1102 coupled to the at least one processor 1101. The non-transitory computer readable medium 1102 may contain instructions executable by the at least one processor 1101, whereby the at least one processor 1101 is configured to: receive, from a Mobility Management Entity, MME, information indicating whether UE power saving is activated or deactivated; receive the request from a IP Multimedia Subsystem Application Server, IMS-AS, subscribing the notification of UE power saving activation and deactivation and send the notification to IMS-AS when power saving is activated or deactivated; during the terminating call, or in response of a UE power saving status request from the IMS-AS, initiate a current power saving status query to the mobility management node in order to obtain a current power saving status of the UE; and during the terminating call, forward the current power saving status to IMS domain.

In one embodiment, the at least one processor 1101 further configured to: send the information indicating whether UE power saving is activated or deactivated to the IMS-AS in a User Data Answer message in an IMS registration process, upon received from the MME.

In one embodiment, the current power saving status may indicate whether the UE is currently reachable and optionally indicate a time when the UE can be reachable.

Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

Note that, the embodiments shown in FIG. 11 may be embodied in hardware and/or in software (including firmware, resident software, micro-code, etc.) that runs on a processor such as a digital signal processor, which may collectively be referred to as "circuitry," "a module" or variants thereof. That is, in one embodiment, the operation of receiving information indicating whether UE power saving is activated or deactivated and the operation of receive the request from IMS-AS can be embodied in a circuitry (for example a receiving circuitry) or a module (for example a receiving module); the operation of sending the notification to IMS-AS can be embodied in a circuitry (for example a sending circuitry) or a module (for example a sending module), the operation of initiating a current power saving status query can be embodied in a circuitry (for example a initiating circuitry) or a module (for example a initiating module), and the operation of forwarding the current power saving status can be embodied in a circuitry (for example a forwarding circuitry) or a module (for example a forwarding module). Accordingly, the other operation of the at least one processor 1101 can be embodied in respective circuitry, module or variants thereof.

With the embodiments shown in FIG. 11 and the above variant, the time and network resource for the terminating call can be saved and the user's experience can be enhanced.

Figure 12:
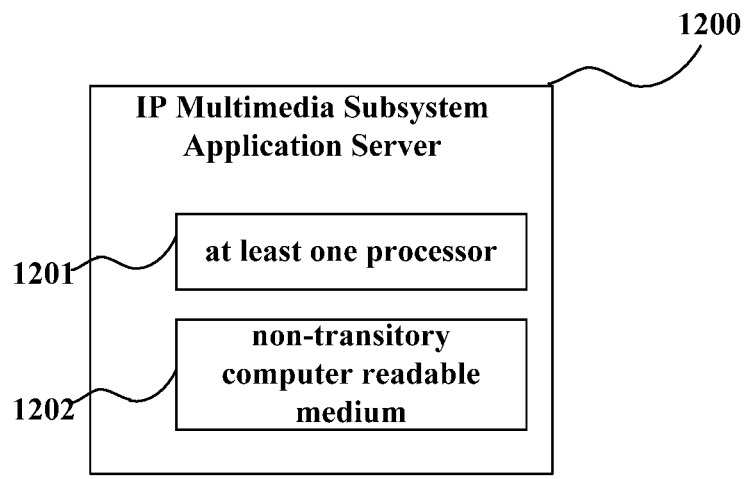
FIG. 12 is a schematic block diagram showing an apparatus configured to operate as IMS-AS for handling terminating call for UE using power saving functionality, according to embodiments.

FIG. 12 is a schematic block diagram showing an apparatus 1200 configured to operate as IMS-AS for handling terminating call for UE using power saving functionality, according to embodiments.

In one embodiment, the apparatus 1200 may comprise: at least one processor 1201; and a non-transitory computer readable medium 1202 coupled to the at least one processor 1201. The non-transitory computer readable medium 1202 may contain instructions executable by the at least one processor 1201, whereby the at least one processor 1201 is configured to: obtain power saving information of the UE; handle the terminating call based on the power saving information.

In one embodiment, the power saving information includes information indicating whether UE power saving is activated or deactivated and current power saving status. In one embodiment, the current power saving status may indicate whether the UE is currently reachable and optionally indicate a time when the UE can be reachable.

In one embodiment, information indicating whether UE power saving is activated or deactivated is obtained from the HSS in a User Data Answer message in an IMS registration process.

In one embodiment, in operation of obtaining information indicating whether UE power saving is activated or deactivated, the at least one processor is further configured to: send a Subscribe Notifications Request to a HSS to subscribe the change of information indicating whether UE power saving is activated or deactivated; receive a Notification including information indicating whether UE power saving is activated or deactivated.

In one embodiment, information indicating whether UE power saving is activated or deactivated is obtained from the UE in a SIP registration message in an IMS registration process.

In one embodiment, operation of obtaining the current power saving status, the at least one processor 1201 is further configured to: send a User Data Request message to a Home Subscriber Server, HSS, in response to the terminating call, in order to initiating a UE power saving status request; receive a User Data Answer message including the current power saving status from the HSS, wherein the HSS obtains the current power saving status from a Mobility Management Entity, MME via a further query.

In one embodiment, in the operation of handling the terminating call, the at least one processor 1201 is further configured to perform one of the following: continuing with the call if UE is reachable; rejecting the call directly if the UE is not reachable; continuing with the call even if the UE is not reachable but will become reachable within a short period; rejecting the call with an indication to originating side that the call can be made some time later; triggering applicable supplementary services, such as forwarding to voice mail or announcement.

Note that, in another embodiment, for 5G, MME can be replaced by AMF (or SMF); HSS can be replaced with UDM. In yet another embodiment, the MME, AMF (or SMF) can be referred as a general term, such as a mobility management node; and the HSS and UDM can be referred as a general term, such as a subscriber serving node.

Note that, the embodiments shown in FIG. 12 may be embodied in hardware and/or in software (including firmware, resident software, micro-code, etc.) that runs on a processor such as a digital signal processor, which may collectively be referred to as "circuitry," "a module" or variants thereof. That is, in one embodiment, the operation of obtaining power saving information of the UE can be embodied in a circuitry (for example a obtaining circuitry) or a module (for example a obtaining module); and the operation of handling the terminating call based on the power saving information can be embodied in a circuitry (for example a handling circuitry) or a module (for example a handling module). Accordingly, the other operation of the at least one processor 1201 can be embodied in respective circuitry, module or variants thereof.

With the embodiments shown in FIG. 12 and the above variant, the time and network resource for the terminating call can be saved and the user's experience can be enhanced.

Figure 13:
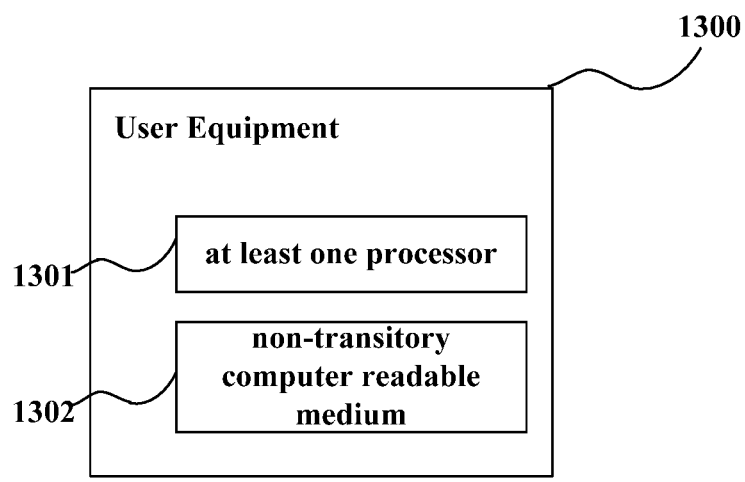
FIG. 13 is a schematic block diagram showing an apparatus configured to operate as UE using power saving functionality for facilitating to handle terminating call, according to embodiments.

FIG. 13 is a schematic block diagram showing an apparatus 1300 configured to operate as UE using power saving functionality for facilitating to handle terminating call, according to embodiments.

In one embodiment, the apparatus 1300 may comprise: at least one processor 1301; and a non-transitory computer readable medium 1302 coupled to the at least one processor 1301. The non-transitory computer readable medium 1302 may contain instructions executable by the at least one processor 1301, whereby the at least one processor 1301 is configured to: determine the power saving functionality to be activated or deactivated, send information indicating whether UE power saving is activated or deactivated to IP Multimedia Subsystem, IMS, domain, in order to handle the terminating call accordingly in the IMS domain.

In one embodiment, the UE sends the information indicating whether UE power saving is activated or deactivated using IMS registration or reregistration procedure.

Note that, the embodiments shown in FIG. 13 may be embodied in hardware and/or in software (including firmware, resident software, micro-code, etc.) that runs on a processor such as a digital signal processor, which may collectively be referred to as "circuitry," "a module" or variants thereof. That is, in one embodiment, the operation of determining the power saving functionality to be activated or deactivated can be embodied in a circuitry (for example a determining circuitry) or a module (for example a determining module); and the operation of sending information indicating whether UE power saving is activated or deactivated can be embodied in a circuitry (for example a sending circuitry) or a module (for example a sending module). Accordingly, the other operation of the at least one processor 1301 can be embodied in respective circuitry, module or variants thereof.

With the embodiments shown in FIG. 13 and the above variant, the time and network resource for the terminating call can be saved and the user's experience can be enhanced.

Figure 14:
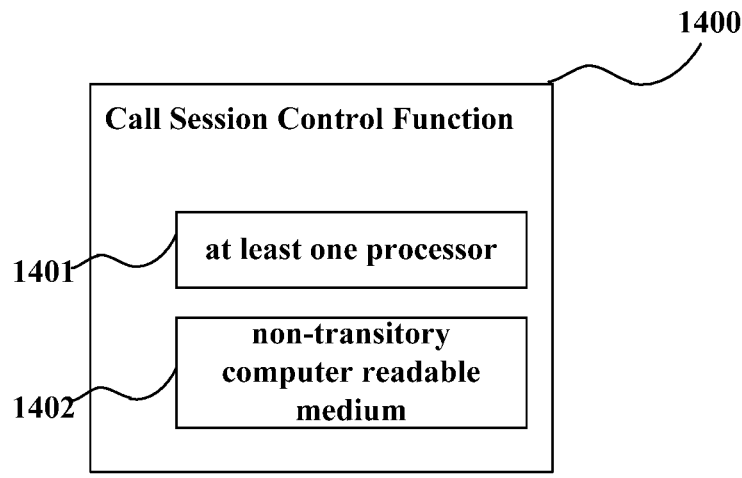
FIG. 14 is a schematic block diagram showing an apparatus configured to operate as CSCF for facilitating to handle terminating call for UE using power saving functionality, according to embodiments.

FIG. 14 is a schematic block diagram showing an apparatus 1400 configured to operate as CSCF for facilitating to handle terminating call for UE using power saving functionality, according to embodiments.

In one embodiment, the apparatus 1400 may comprise: at least one processor 1401; and a non-transitory computer readable medium 1402 coupled to the at least one processor 1401. The non-transitory computer readable medium 1402 may contain instructions executable by the at least one processor 1401, whereby the at least one processor is configured to: receive power saving information of the UE; transparently forward the power saving information to a IP Multimedia Subsystem Application Server, IMS-AS, in order to handle the terminating call in the IMS domain according to the power saving information.

In one embodiment, the power saving information includes information indicating whether UE power saving is activated or deactivated and current power saving status. In one embodiment, the current power saving status may indicate whether the UE is currently reachable and optionally indicate a time when the UE can be reachable. In one embodiment, the CSCF is I-CSCF, or S-CSCF.

Note that, the embodiments shown in FIG. 14 may be embodied in hardware and/or in software (including firmware, resident software, micro-code, etc.) that runs on a processor such as a digital signal processor, which may collectively be referred to as "circuitry," "a module" or variants thereof. That is, in one embodiment, the operation of receiving power saving information of the UE can be embodied in a circuitry (for example a receiving circuitry) or a module (for example a receiving module); and the operation of transparently forwarding the power saving information can be embodied in a circuitry (for example a forwarding circuitry) or a module (for example a forwarding module). Accordingly, the other operation of the at least one processor 1401 can be embodied in respective circuitry, module or variants thereof.

With the embodiments shown in FIG. 14 and the above variant, the time and network resource for the terminating call can be saved and the user's experience can be enhanced.

Figure 15:
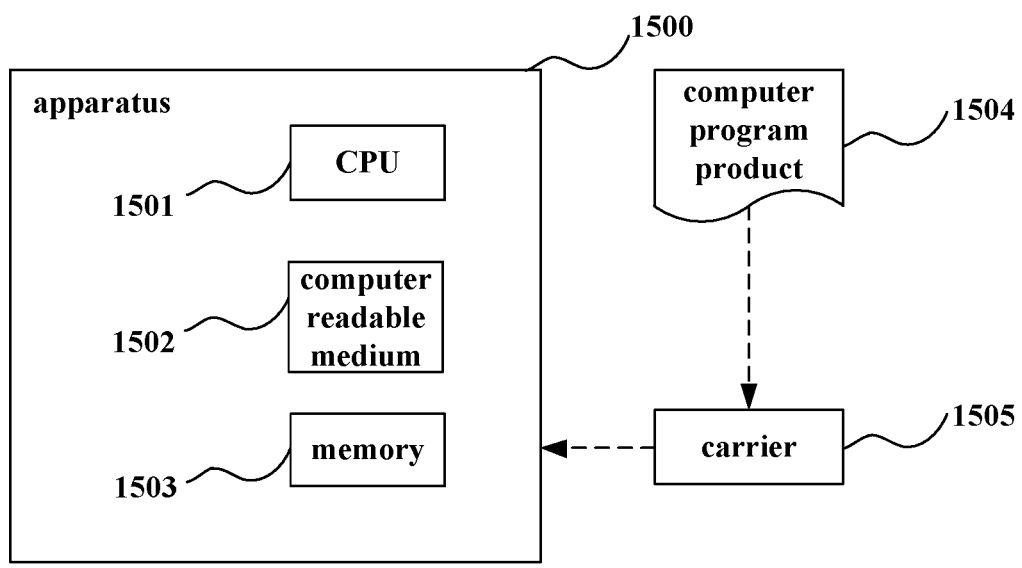
FIG. 15 is a schematic block diagram showing an apparatus, according to embodiments.

FIG. 15 is a schematic block diagram showing an apparatus, according to embodiments. In one embodiment, the apparatus 1500 can be configured as any of the above mentioned apparatus, such as UE, MME, AMF, SMF, HSS, UDM, CSCF, I-CSCF, S-CFCS, or IMS-AS.

In one embodiment, the apparatus 1500 may include but not limited to a Central Processing Unit, CPU, 1501, a computer-readable medium 1502, and a memory 1503.

The memory 1503 may comprise a volatile (e.g. Random Access Memory, RAM) and/or non-volatile memory (e.g. a hard disk or flash memory). In one embodiment, the computer-readable medium 1502 may be configured to store a computer program and/or instructions, which, when executed by the processor 1501, causes the processor 1501 to carry out any of the above mentioned methods. In another embodiment, the computer program can be stored in a remote location for example computer program product 1504, and accessible by the processor 1501 via for example carrier 1505.

The computer program product 1504 can be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and teaching herein without departing from its central scope. Therefore it is intended that the present embodiments should not be limited to the particular embodiments disclosed as the best mode contemplated for carrying out the present technology, but that the present embodiments include all embodiments falling within the scope of the appended claims.

Although terminology from LTE has been used in this disclosure to exemplify the exemplary embodiments, one of ordinary skill in the art would understand this as not limiting the scope of the present embodiments to only the aforementioned system. Other wireless systems, including 3GPP, 3GPP HSP, LTE-A, WiMax, UMB and GSM, 5G, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

3GPP third Generation Partnership Project
5G 5th generation of radio NW
AMF Access and Mobility Management Function
AS Application Server
AVP Attribute-Value Pair
DDN Digital Data Network
eDRX extended idle mode DRX
E-UTRAN Evolved Universal Terrestrial Radio Access Network
EPC Evolved Packet Core
GPRS General Packet Radio Service
HSS Home Subscriber Server
IMS IP Multimedia Subsystem
IMS-AS IP Multimedia Subsystem Application Server
I-CSCF Interrogating Call Session Control Function
MME Mobility Management Entity
MMTel MultiMedia Telephony
P-CSCF Proxy Call Session Control Function
PDN Packet Data Network
PGW PDN GateWay
PSM Power Saving Mode
RAN Radio Access Network
S-CSCF Serving Call Session Control Function
SCC Serial Communication Controller
SIP Session Initiation Protocol
SGSN Serving GPRS Support Node
SGW Serving GateWay
SMF Session Management Function
T-ADS Terminating-Access Domain Selection
TAU Tracking Area Update
UDM Unified Data Management
UE User Equipment
VoLTE Voice over LTE.

What is claimed is:

1. A method in an Internet Protocol, IP, Multimedia Subsystem Application Server, IMS-AS, for handling a terminating call for a User Equipment, UE, using power saving functionality, the method comprising:
   obtaining power saving information of the UE, wherein the power saving information includes information indicating whether UE power saving is activated or deactivated and current power saving status, the current power saving status indicates whether the UE is currently reachable or a time when the UE can be reachable, and obtaining the current power saving status comprises:
      sending a User Data Request message to a Home Subscriber Server, HSS, in response to the terminating call, in order to initiate a UE power saving status request and
      receiving a User Data Answer message including the current power saving status from the HSS, wherein the HSS obtains the current power saving status from a Mobility Management Entity, MME via a further query; and
   handling the terminating call based on the power saving information.

2. The method according to claim 1, wherein information indicating whether UE power saving is activated or deactivated is obtained from a Home Subscriber Server, HSS, in a User Data Answer message in an IMS registration process.

3. Method according to claim 1, wherein information indicating whether UE power saving is activated or deactivated is obtained from the UE in a Session Initiation Protocol, SIP, registration message in an IMS registration process.

4. The method according to claim 1, wherein handling the terminating call further comprising one of the following:
   a. continuing with the call if the UE is reachable;
   b. rejecting the call directly if the UE is not reachable;
   c. continuing with the call even if the UE is not reachable but will become reachable within a short period;
   d. rejecting the call with an indication to originating side that the call can be made some time later; and
   e. triggering applicable supplementary services.

5. An apparatus for handling a terminating call for a User Equipment, UE, using power saving functionality, the apparatus comprising:
   at least one processor; and
   a non-transitory computer readable medium coupled to the at least one processor, the non-transitory computer readable medium containing instructions executable by the at least one processor, whereby the at least one processor is configured to perform steps in the method according to claim 1.

6. A non-transitory computer readable medium comprising computer readable code, which when run on an apparatus, causes the apparatus to perform the method according to claim 1.

7. A method in an Internet Protocol, IP, Multimedia Subsystem Application Server, IMS-AS, for handling a terminating call for a User Equipment, UE, using power saving functionality, the method comprising:
   obtaining power saving information of the UE, wherein the power saving information includes information indicating whether UE power saving is activated or deactivated and current power saving status, the current power saving status indicates whether the UE is currently reachable or a time when the UE can be reachable, and obtaining the information indicating whether UE power saving is activated or deactivated comprises:
   sending a Subscribe Notifications Request to a Home Subscriber Server, HSS, to subscribe the change of information indicating whether UE power saving is activated or deactivated; and
   receiving a Notification including information indicating whether UE power saving is activated or deactivated.

8. The method according to claim 7, wherein obtaining the current power saving status comprises:
   sending a User Data Request message to a Home Subscriber Server, HSS, in response to the terminating call, in order to initiate a UE power saving status request; and
   receiving a User Data Answer message including the current power saving status from the HSS,
   wherein the HSS obtains the current power saving status from a Mobility Management Entity, MME via a further query.

9. A method in an Internet Protocol, IP, Multimedia Subsystem Application Server, IMS-AS, for handling a terminating call for a User Equipment, UE, using power saving functionality, the method comprising:
   obtaining power saving information of the UE; and
   handling the terminating call based on the power saving information, wherein handling the terminating call comprises triggering applicable supplementary services, and triggering applicable supplementary services comprises forwarding to voice mail or announcement.

10. The method according to claim 9, wherein the power saving information includes information indicating whether UE power saving is activated or deactivated and current power saving status, the current power saving status indicates whether the UE is currently reachable or a time when the UE can be reachable.

11. A method in a mobility management node, for facilitating to handle a terminating call for a User Equipment, UE, using power saving functionality, the method comprising:
   informing a subscriber serving node about information indicating whether UE power saving is activated or deactivated; and
   in response of a current power saving status query from the subscriber serving node, providing the current power saving status of the UE to the subscriber serving node, in order to facilitate to handle the terminating call according to the current power saving status.

12. The method according to claim 11, wherein the current power saving status indicates whether the UE is currently reachable or a time when the UE can be reachable.

13. A method in a subscriber serving node, for facilitating to handle a terminating call for a User Equipment, UE, using power saving functionality, the method comprising:
   receiving, from a mobility management node, information indicating whether UE power saving is activated or deactivated;
   receiving a request from an Internet Protocol, IP, Multimedia Subsystem Application Server, IMS-AS, subscribing the notification of UE power saving activation and deactivation and sending the notification to IMS-AS when power saving is activated or deactivated;
   during the terminating call, or in response of a UE power saving status request from the IMS-AS, initiating a current power saving status query to the mobility management node in order to obtain a current power saving status of the UE; and
   during the terminating call, forwarding the current power saving status to IMS domain.

14. The method according to claim 13, further comprising:
   sending the information indicating whether UE power saving is activated or deactivated to the IMS-AS in a User Data Answer message in an IMS registration process, upon receipt from the mobility management node.

15. The method according to claim 13, wherein the current power saving status indicates whether the UE is currently reachable or a time when the UE can be reachable.

16. A method in a User Equipment, UE, using power saving functionality, for facilitating handling of a terminating call for the UE, the method comprising:
   the UE determining the power saving functionality to be activated or deactivated;
   the UE sending information indicating whether UE power saving is activated or deactivated to an Internet Protocol, IP, Multimedia Subsystem, IMS, domain, in order for the IMS domain to handle the terminating call accordingly in the IMS domain.

17. The method according to claim 16, wherein the UE sends the information indicating whether UE power saving is activated or deactivated using an IMS registration or reregistration on procedure.

* * * * *